United States Patent
Suga et al.

(10) Patent No.: US 6,904,240 B1
(45) Date of Patent: Jun. 7, 2005

(54) OPTICAL MULTIPLEXING APPARATUS AND OPTICAL MULTIPLEXING METHOD

(75) Inventors: Katsuhiko Suga, Kawasaki (JP); Takanori Maki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 524 days.

(21) Appl. No.: 09/717,129

(22) Filed: Nov. 22, 2000

(30) Foreign Application Priority Data

May 22, 2000 (JP) ........................................ 2000-149412

(51) Int. Cl.[7] .............................................. H04J 14/02
(52) U.S. Cl. .............................. 398/79; 398/82; 398/85; 398/95
(58) Field of Search .............................. 398/79, 85, 95, 398/65, 82

(56) References Cited

U.S. PATENT DOCUMENTS

| | | | |
|---|---|---|---|
| 6,008,920 A | * 12/1999 | Hendrix | 398/79 |
| 6,040,932 A | * 3/2000 | Duck et al. | 398/1 |
| 6,134,033 A | * 10/2000 | Bergano et al. | 398/184 |
| 6,236,480 B1 | * 5/2001 | Atlas | 398/9 |
| 6,341,040 B1 | * 1/2002 | Tai et al. | 359/584 |
| 6,459,515 B1 | * 10/2002 | Bergano | 398/79 |

FOREIGN PATENT DOCUMENTS

| | | |
|---|---|---|
| JP | 58-70652 | 4/1983 |
| JP | 01077236 A | 3/1989 |

OTHER PUBLICATIONS

Benjamin B. Dingel, et al., "Multi–Function Optical Fiber Using Michelson–Gt Interferometer", The Institute of Electronics Information and Communication Engineers, Technical Report of IEICE, OCS97–50, ED97–140, OPE97–95), Nov. 1997.

* cited by examiner

*Primary Examiner*—M. R. Sedighian
*Assistant Examiner*—Dzung D. Tran
(74) *Attorney, Agent, or Firm*—Staas & Halsey LLP

(57) ABSTRACT

An optical multiplexing apparatus of a low cost is capable of reliably multiplexing a plurality of optical signals having a narrow wavelength interval, while suppressing the nonlinear optical effect and the crosstalk, and a multiplexing method. The optical multiplexing apparatus includes a first optical multiplexer for multiplexing, among a plurality of optical signals that are input with directions of linear polarization of the neighboring wavelengths being differed to each other, optical signals having odd wavelength numbers while maintaining their polarization states. A second optical multiplexer multiplexes optical signals having even wavelength numbers while maintaining their polarization states, and a third optical multiplexer multiplexes, at an output unit thereof through first and second input units having sharp filtering characteristics, the optical signals multiplexed by the first and second optical multiplexing means, to output WDM signal light.

5 Claims, 5 Drawing Sheets

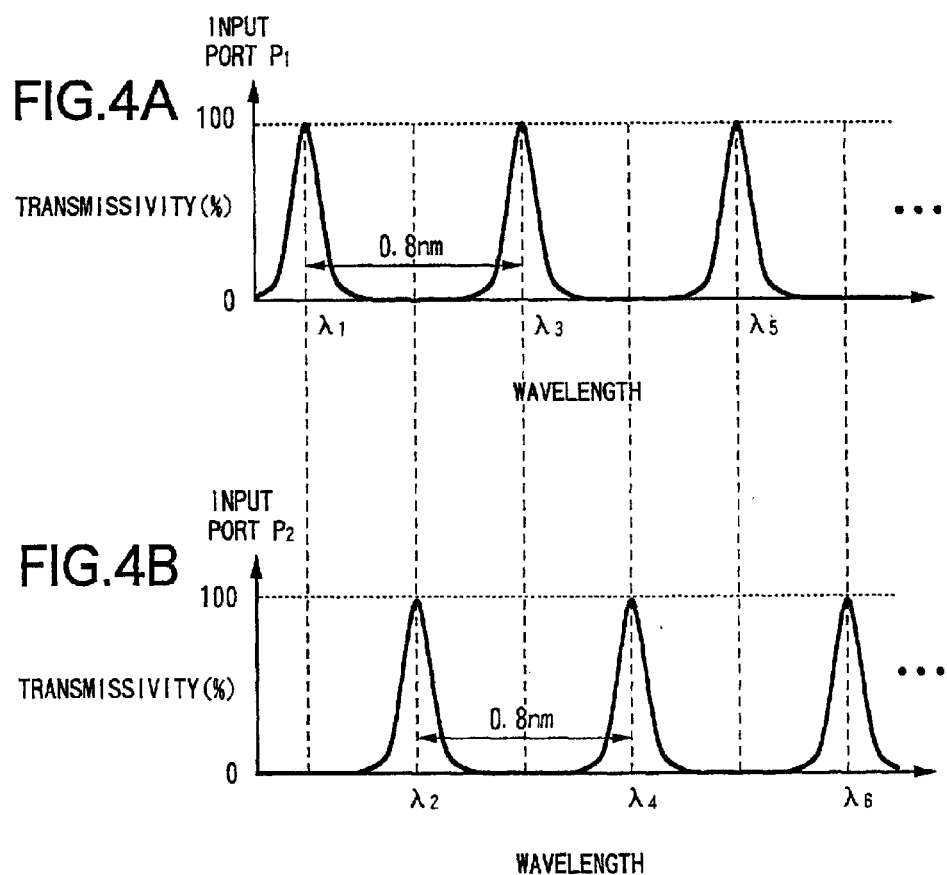

OPTICAL MULTIPLEXING APPARATUS AND OPTICAL MULTIPLEXING METHOD

BACKGROUND OF THE INVENTION

1. Field of the Invention

The present invention relates to an optical multiplexing technology for multiplexing a plurality of optical signals of different wavelengths. More particularly, the invention relates to an optical multiplexing apparatus for reliably multiplexing a plurality of optical signals having narrow wavelength intervals with a simple constitution, and to an optical multiplexing method.

2. Description of the Related Art

In the optical communications In recent years, it has been desired to increase the transmission capacity, and a wavelength division multiplexing (WDM) system has been developed as one of the means. In the optical transmission system according to the WDM system, in general, optical signals of plural wavelengths are transmitted through a single optical transmission line, and are demultiplexed or multiplexed in accordance with their wavelengths while being amplified through an optical amplifier so as to be transmitted to a desired terminal station.

In the optical transmission system according to the WDM system, efforts have been made to further increase the transmission capacity by decreasing the wavelength intervals (channel intervals) of a plurality of optical signals. For example, there has been proposed a system in which the wavelength interval is decreased to be from 100 GHz to 50 GHz. In the above optical transmission system, technology becomes necessary for widening a transmission band without the occurrence of crosstalk among the channels, so that the reliable multiplexing or demultiplexing of the optical signals can be performed in accordance with the wavelengths.

As the conventional optical multiplexing technology for multiplexing optical signals of narrow wavelength intervals, there can be exemplified the one disclosed in Japanese Unexamined Patent Publication No. 58-70652 (Japanese Patent No. 1427285). This publication is constituted by the combination of an optical multiplexing circuit having wavelength dependency and an optical multiplexing circuit without wavelength dependency. For example, optical signals of every other wavelengths are multiplexed by a first optical multiplexing circuit having wavelength dependency, optical signals of the remaining wavelengths are multiplexed by a second optical multiplexing circuit having wavelength dependency, and output light from the first and second optical multiplexing circuits are multiplexed together by an optical multiplexing circuit without wavelength dependency.

However, when the wavelength intervals of the optical signals to be multiplexed are set to be as very narrow as, for example, 50 GHz, the influence of nonlinear optical effect becomes a problem together with the occurrence of crosstalk among the channels. Concretely speaking, when the optical signals of neighboring wavelengths are under the same polarization state in a wavelength interval of 50 GHz, it is considered that the power levels of the respective optical signals are susceptible to the influence of the nonlinear optical effect such as the four light wave mixing. In order to relax the nonlinear optical effect, it is effective to differ the polarizing state of the neighboring wavelengths and, particularly effective to employ a cross polarization system.

However, it is not easy to multiplex the optical signals having narrow wavelength intervals while maintaining their polarization states. When an existing optical device is considered, such as an arrayed waveguide grating (hereinafter referred to as AWG), it is relatively easy to multiplex a plurality of optical signals in the identical polarization state while maintaining their polarization state, but it is very difficult to realize the multiplexing when they are different in polarization states. Besides, even if an optical device is realized which is capable of multiplexing such optical signals, its cost will be very high.

Further, even if the nonlinear optical effect is relaxed by the employment of the cross polarization system, crosstalk occurs among the channels accompanying a decrease in the wavelength interval unless the optical device multiplexing the optical signals exhibits sharp filter characteristics, to deteriorate the transmission characteristics. The sharp filter characteristics referred to here stand for that the transmission band width of the filter is narrow to a sufficient degree.

According to the conventional optical multiplexing technology disclosed in the above Japanese Unexamined Patent Publication No. 58-70652, optical signals of neighboring wavelengths are multiplexed while maintaining the cross polarization state. It is possible to decrease the influence due to the nonlinear optical effect accompanying a decrease in the wavelength interval but it is difficult to sufficiently suppress the occurrence of crosstalk among the channels. That is, the above conventional technique uses interference-film type optical devices as the first and second optical multiplexing circuits. In general, however, since the interference-film type optical devices have poor filter characteristics, the wavelength interval that can be coped with is restricted. When the wavelength interval becomes as narrow as about 50 GHz, although the optical devices having a wavelength interval of twice as wide can be used as the first and second optical multiplexing circuits, it is impossible to avoid deterioration in the transmission characteristics due to crosstalk only by simply multiplexing a set of cross polarized optical signals without any contrivance for suppressing the crosstalk in the third optical multiplexing circuit.

SUMMARY OF THE INVENTION

The present invention was accomplished by giving attention to the above-mentioned points, and has an object of providing an optical multiplexing apparatus of a low cost capable of reliably multiplexing a plurality of optical signals having narrow wavelength intervals while suppressing the nonlinear optical effect and crosstalk, and an optical multiplexing method.

In order to accomplish the above-mentioned object, an optical multiplexing apparatus according to the present invention, as shown in FIG. 1, for multiplexing a plurality of optical signals having different wavelengths, comprises:

first optical multiplexing means 1 for multiplexing, among a plurality of optical signals that are input with directions of linear polarization of neighboring wavelengths being differed to each other and are successively given wavelength numbers depending upon the wavelengths, optical signals corresponding to odd wavelength numbers while maintaining their polarization states;

second optical multiplexing means 2 for multiplexing optical signals corresponding to even wavelength numbers among said plurality of optical signals while maintaining their polarization states; and third optical multiplexing means 3 including:
a first input unit 3A for filtering the optical signals multiplexed by said first optical multiplexing means in accordance with filter characteristics that include a transmission wavelength band with the wavelengths of odd numbers as centers, and have the band width of said transmission wavelength band which is narrower than the band width of transmission wavelength band of filter characteristics of said first optical multiplexing means;

a second input unit 3B for filtering the optical signals multiplexed by said second optical multiplexing means in accordance with filter characteristics that include a transmission wavelength band with the wavelengths of even numbers as centers, and have the band width of said transmission wavelength band which is narrower than the band width of transmission wavelength band of filter characteristics of said second optical multiplexing means; and an output unit 3C for multiplexing the optical signals output from said first input unit 3A and the optical signals output from said second input unit 3B to output the multiplexed signal light According to this constitution, a plurality of optical signals that are input with directions of polarization of neighboring wavelengths being differed to each other are grouped into optical signals of odd wavelength numbers and optical signals of even wavelength numbers, to be multiplexed by the first optical multiplexing means and the second optical multiplexing means, respectively, while maintaining their polarization states. The optical signals having odd wavelength numbers and having even wavelength numbers are further multiplexed by the third optical multiplexing means having filter characteristics more sharp than those of the first and second optical multiplexing means 1 and 2, to be output as a WDM signal light. This makes it possible to reliably multiplex a plurality of optical signals having narrow wavelength intervals while suppressing the influence of nonlinear optical effect and the occurrence of crosstalk.

With the above optical multiplexing apparatus, it is preferable that a plurality of optical signals are input with directions of linear polarization of neighboring wavelengths being orthogonal to each other. This makes it possible to reliably decrease the influence of nonlinear optical effect.

As the concrete constitution of the above optical multiplexing apparatus, further, the third optical multiplexing means 3 may be provided with a function for maintaining a polarization state. This makes it possible to multiplex the optical signals having odd wavelength numbers and even wavelength numbers in a state where directions of polarization of the neighboring wavelengths are more reliably differed to each other.

Further, an optical multiplexing method according to the present invention, of multiplexing a plurality of optical signals having different wavelengths, comprising:

a first optical multiplexing step of multiplexing, among a plurality of optical signals that are input with directions of linear polarization of neighboring wavelengths being differed to each other and are successively given wavelength numbers depending upon the wavelengths, optical signals corresponding to odd wavelength numbers while maintaining their polarization states;

second optical multiplexing step of multiplexing optical signals corresponding to even wavelength numbers among said plurality of optical signals while maintaining their polarization states; and third optical multiplexing step of:

filtering the optical signals multiplexed by said first optical multiplexing step in accordance with filter characteristics that include a transmission wavelength band with the wavelengths of odd numbers as centers, and have the band width of said transmission wavelength band which is narrower than the band width of transmission wavelength band of filter characteristics of said first optical multiplexing step;

filtering the optical signals multiplexed by said second optical multiplexing means in accordance with filter characteristics that include a transmission wavelength band with the wavelengths of even numbers as centers, and have the band width of said transmission wavelength band which is narrower than the band width of transmission wavelength band of filter characteristics of said second optical multiplexing step; and multiplexing the respective filtered optical signals to output the multiplexed signal light.

Other objects, features and advantages of the invention will become apparent from the following description of the embodiment in conjunction with the accompanying drawings.

BRIEF DESCRIPTION OF THE DRAWINGS

FIG. 3 is a diagram showing filter characteristics of an AWG used in the embodiment, wherein

FIG. 4 is a diagram showing filter characteristics corresponding to respective input ports of an interleaver used in the above embodiment, wherein FIG. 4A shows characteristics corresponding to the input port on the odd wavelength number side, and FIG. 4B shows characteristics corresponding to the input port on the even wavelength number side.

DESCRIPTION OF THE PREFERRED EMBODIMENT

An embodiment of the invention will now be described with reference to the drawings.

Figure 1:
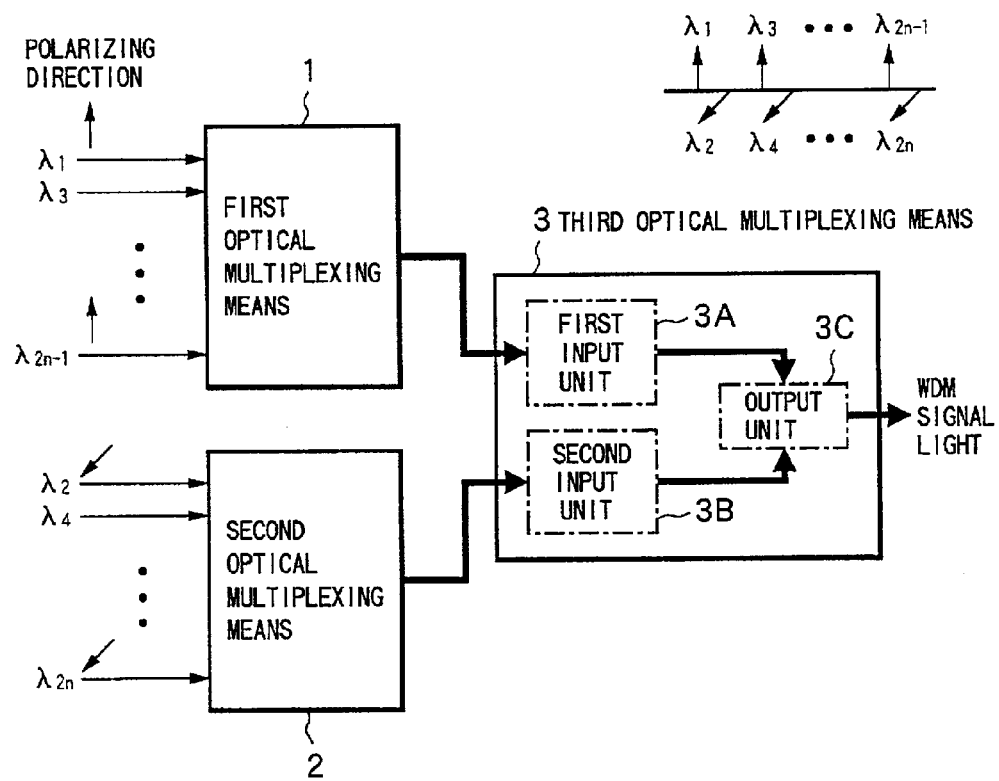
FIG. 1 is a diagram showing a basic constitution of an optical multiplexing apparatus according to the present invention.
Figure 2:
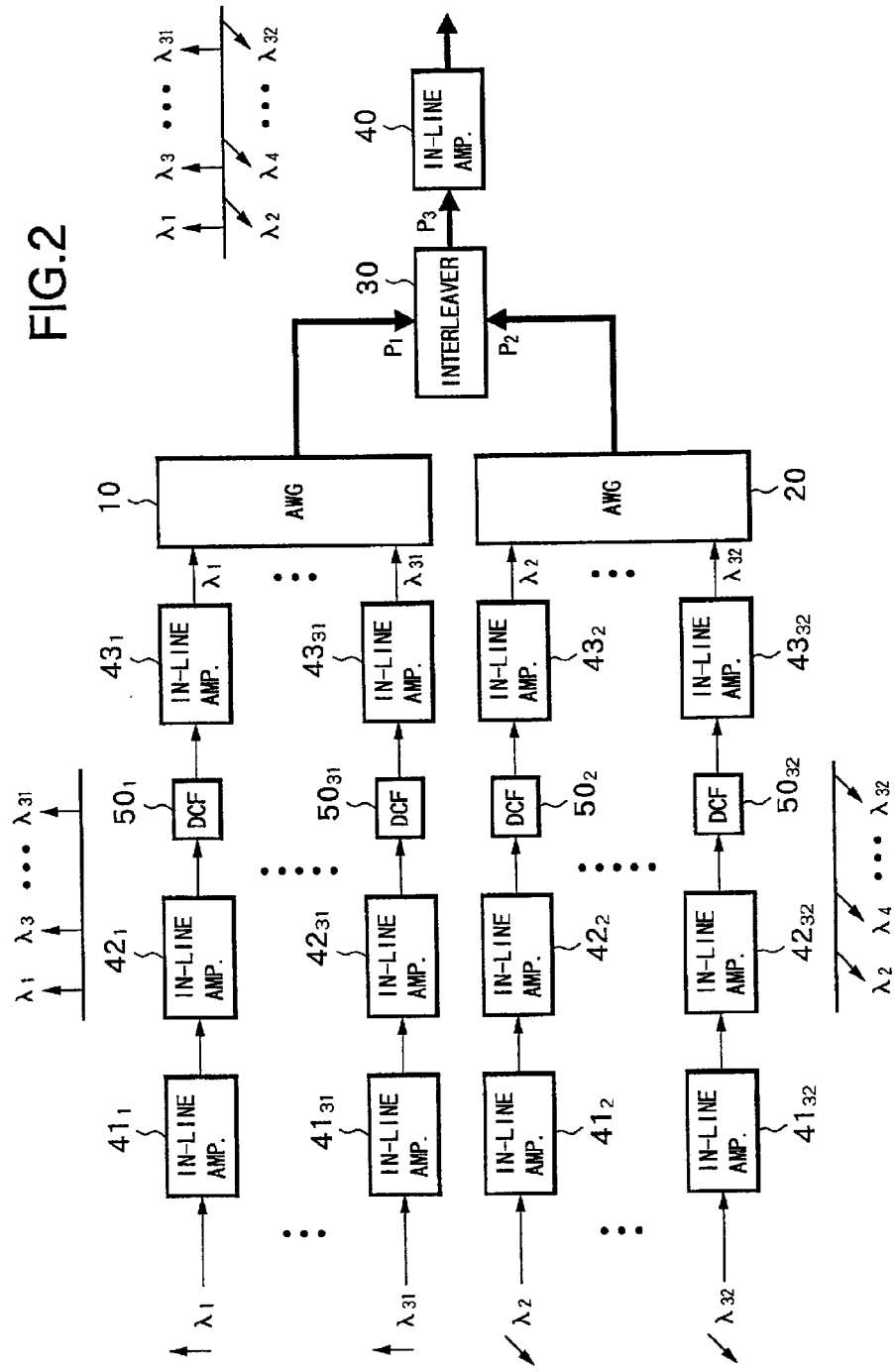
FIG. 2 is a block diagram showing the constitution of an optical multiplexing apparatus according to an embodiment of the present invention.

FIG. 2 is a diagram showing a constitution of an optical multiplexing apparatus according to the embodiment of the present invention.

In FIG. 2, the present optical multiplexing apparatus includes: in-line amplifiers $41_1$ to $41_{32}$, $42_1$ to $42_{32}$ and $43_1$ to $43_{32}$ of a three-stage constitution for amplifying incident optical signals of a plurality of wavelengths (here, 32 waves are presumed, and their wavelengths are denoted by $\lambda_1$ to $\lambda_{32}$) for each of the wavelengths; dispersion compensation fibers (hereinafter referred to as DCFs) $50_1$ to $50_{32}$ connected, respectively, between the in-line amplifiers $42_1$ to $42_{32}$ of the second stage and the in-line amplifiers $43_1$ to $43_{32}$ of the third stage; an array waveguide grating (AWG) 10 as a first optical multiplexing means 1 for multiplexing optical signals output from the in-line amplifiers $43_1$, - - -, $43_{31}$ corresponding to wavelengths of odd numbers $\lambda_1$, - - -, $\lambda_{31}$; an array waveguide grating (AWG) 20 as a second optical multiplexing means 2 for multiplexing optical signals output from the in-line amplifiers $43_2$, - - - , $43_{32}$ corresponding to wavelengths of even numbers $\lambda_2$, - - - , $\lambda_{32}$; an interleaver 30 as a third optical multiplexing means 3 for further multiplexing optical signals of odd wavelengths multiplexed by the AWG 10 and optical signals of even wavelengths multiplexed by the AWG 20 to generate wavelength division multiplexed (WDM) signal light of wavelengths $\lambda_1$ to $\lambda_{32}$; and an in-line amplifier 40 for amplifying the WDM signal light output from the interleaver 30. Subscripts attached to the signs correspond to the wavelength numbers.

Although not shown in the figure, the optical signals of respective wavelengths input to the present optical amplifying apparatus may be optical signals sent from an optical transmitters corresponding to the respective wavelengths or optical signals of respective wavelengths branched by an ADM (add/drop multiplexer) device connected to an optical network. Further, optical signals of respective wavelengths are incident on the present optical amplifying apparatus such that the neighboring wavelengths are polarized in orthogonal to each other. Here, for example, as shown in FIG. 2, the direction of linear polarization of optical signals of odd wavelengths is oriented to the vertical direction in a plane perpendicular to the propagation direction, and the direction of linear polarization of optical signals of even wavelengths is oriented to the horizontal direction in a plane perpendicular to the propagation direction. The wavelength interval (channel interval) of incident light has been set to be very narrow such as 50 GHz (about 0.4 nm in a 1.5 μm band).

The in-line amplifiers $41_1$ to $41_{32}$, $42_1$ to $42_{32}$ and $43_1$ to $43_{32}$ corresponding to the respective wavelengths $\lambda_1$ to $\lambda_{32}$, amplify the input optical signals up to a required level while maintaining their polarization states, to output the amplified optical signals. Optical transmission lines connected to the in-line amplifiers also have a function for maintaining the polarization. Although the in-line amplifiers were arranged in three stages on the input side for each of the wavelengths, the presence or the number of stages of the in-line amplifiers on the input side can be suitably determined depending upon the system to which the apparatus of the invention is adapted.

The DCFs $50_1$ to $50_{32}$ corresponding to the respective wavelengths $\lambda_1$ to $\lambda_{32}$ is for compensating for the dispersion of wavelengths generated along the optical transmission lines connected to the present apparatus, and compensate for the wavelength dispersion of the input optical signals while maintaining their polarization states. The arrangement of the DCFs $50_1$ to $50_{32}$ is not limited to the above-mentioned places. Further, when there is no need of compensating for the wavelength dispersion, the DCFs $50_1$ to $50_{32}$ may be omitted. Moreover, when it is difficult to use the dispersion compensation devices having a function for maintaining the polarization, the dispersion may be compensated by the dispersion compensation devices of the polarization independent type on or after the output side of the interleaver 30.

The AWGs 10 and 20 are known optical devices for multiplexing/demultiplexing the optical signals by utilizing the multiple beam interference. Here, the AWG 10 has input ports corresponding to the optical signals of odd wavelengths $\lambda_1$, - - - , $\lambda_{31}$ and an output port, and multiplexes the optical signals of the odd wavelength numbers while maintaining their polarization to output the multiplexed signal light. The AWG 20 has input ports corresponding to the optical signals of even wavelengths $\lambda_2$, - - - , $\lambda_{32}$ and an output port, and multiplexes the optical signals of the even wavelengths while maintaining their polarization to output the multiplexed signal light. As the AWG of the type of maintaining the polarization, such an AWG is suitable, wherein a waveguide is formed by using a material having a large index of double refraction to realize the function of maintaining the polarization.

Figure 3A:
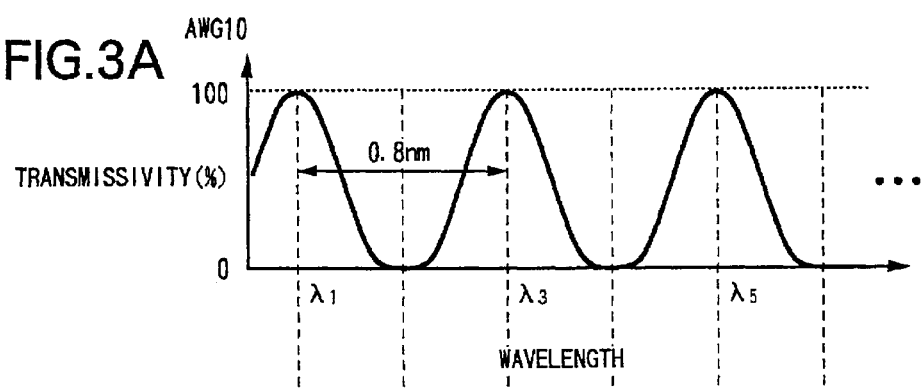
FIG. 3A shows characteristics of the AWG on the odd wavelength number side.
Figure 3B:
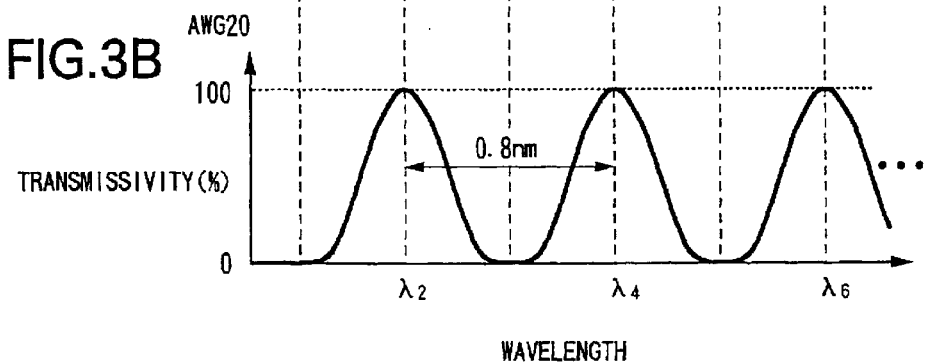
FIG. 3B shows characteristics of the AWG on the even wavelength number side.

FIG. 3 is a diagram showing filter characteristics possessed by the AWGs 10 and 20, wherein FIG. 3A shows characteristics of the AWG 10 and FIG. 3B shows characteristics of the AWG 20.

As shown in FIG. 3A, the AWG 10 has periodic filter characteristics in which the transmissivity becomes a maximum corresponding to odd wavelengths $\lambda_1, \lambda_3$, - - - , and the AWG 20 has, as shown in FIG. 3B, periodic filter characteristics in which the transmissivity becomes a maximum corresponding to the even wavelengths $\lambda_2, \lambda_4$, - - - .

The interleaver 30 is an optical device having two input ports $P_1$, $P_2$ and one output port $P_3$, and has periodic filter characteristics.

FIG. 4 is a diagram showing filter characteristics corresponding to the input ports of the interleaver 30, wherein FIG. 4A shows transmission wavelength characteristics corresponding to the input port $P_1$ and FIG. 4B shows transmission wavelength characteristics corresponding to the input port $P_2$.

Referring to FIG. 4A, the filter characteristics corresponding to the input port $P_1$ have periodic characteristics in which the transmissivity becomes a maximum corresponding to the odd wavelengths $\lambda_1, \lambda_3$, - - - , and the widths of the transmission wavelength bands with the respective odd wavelengths as centers are narrower than the widths of the transmission wavelength bands in the filter characteristics of the AWG 10 shown in FIG. 3A. Referring to FIG. 4B, further, the filter characteristics corresponding to the input port $P_2$ have periodic characteristics in which the transmissivity becomes a maximum corresponding to the even wavelengths $\lambda_2, \lambda_4$, - - - , and the widths of the transmission wavelength bands with the respective even wavelengths as centers are narrower than the widths of the transmission wavelength bands in the filter characteristics of the AWG 20 shown in FIG. 3B.

The respective optical signals of odd wavelengths and even wavelengths input to the respective input ports $P_1$, $P_2$ are filtered in accordance with the above-mentioned characteristics, and then multiplexed, and WDM signal light maintained in a cross polarization state is output from the output port $P_3$. The respective optical transmission lines connected to the input ports $P_1$ and $P_2$ of the interleaver 30 have a function for maintaining the polarization. Further, it is desired that the interleaver 30 itself is a device having a function for maintaining the polarization. However, when the respective optical signals of odd wavelengths and even wavelengths input to the interleaver 30, are reliably maintained in the cross polarization state, there may be used a device of the polarization independent type.

An advantage of multiplexing the respective optical signals odd wavelengths and even wavelengths output, respectively, from the AWGs 10 and 20, is in that the respective optical signals having very narrow wavelength intervals can be multiplexed while suppressing the crosstalk as a result of filtering the respective optical signals by combining sharp filtering characteristics as shown in FIG. 4. As a concrete example for realizing the filter characteristics as shown in FIG. 4, technology has been proposed in an article: Dingel Benjamin, et al., "Multifunctional Optical Filter using a Michelson GT Interferometer (MGTI)", Shingaku Giho, OCS 97-50, pp. 67–72, 1997. This technology will be briefly described here.

Figure 5:
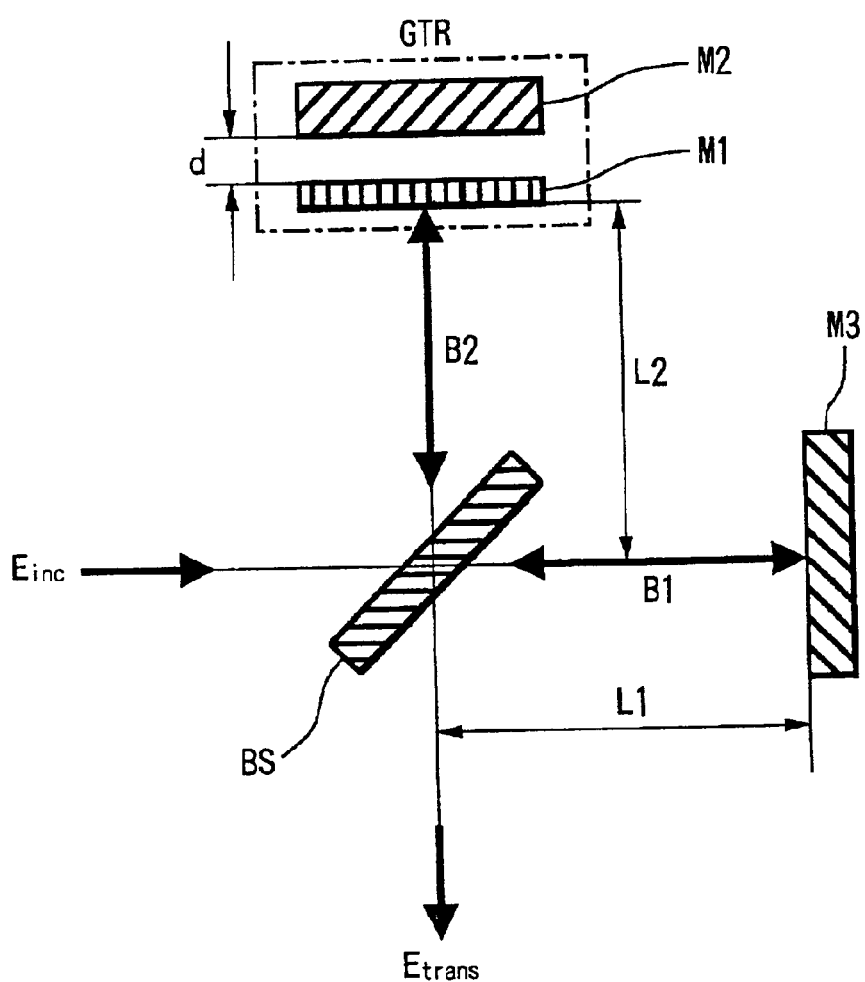
FIG. 5 is a diagram showing a concrete constitutional example for realizing the filter characteristics of the interleaver used in the above embodiment.

The multifunctional optical filter using MGTI disclosed in the above article has a constitution in which a reflecting mirror in the typical Michelson interferometer is replaced by a Gires-Toumois resonator (hereinafter abbreviated as GTR) as shown in a constitutional diagram of FIG. 5. Basically, the GTR is a loss-free and asymmetrical Fabry-Perot resonator having a partial reflecting mirror M1 and a total reflecting mirror M2. In the optical filter of this constitution, the incident light $E_{inc}$ is separated into two light beams B1 and B2 by a beam splitter BS. The two light beams B1 and B2 are propagated through two optical paths (optical path lengths of L1 and L2) of the interferometer. The light beam B1 reflected by the total reflecting mirror M3 and the light beam B2 reflected by the GTR are interfered and multiplexed together through the beam splitter BS to become outgoing light $E_{trans}$. In this way, sharp transmission wavelength characteristics having a half spectrum line width compared to the typical Fabry-Perot filter is realized.

The concrete constitution of the interleaver 30 is not limited to the one that uses MGTI as described above. For example, the interleaver may be constituted by applying a Mach-Zender interferometer or by using a fiber grating. Further, the optical device for multiplexing the optical signals having odd wavelengths and even wavelengths, is not limited to the interleaver only but may be a known optical device equipped with the above-mentioned functional features.

The in-line amplifier 40 is a known optical amplifier which amplifies collectively WDM signal light including optical signals of wavelengths $\lambda_1$ to $\lambda_{32}$ output from the interleaver 30 up to a required level. The WDM signal light amplified by the in-line amplifier 40 is sent to an optical circuit network connected to a repeater, the reception terminal and the like. As the optical device connected in a succeeding stage of the output port of the interleaver 30, a polarization independent type optical device may be used. Here, the WDM signal light multiplexed by the interleaver 30 is collectively amplified through the inline amplifier of one stage and then sent to the optical circuit network. However, the presence and the number of stages of the in-line amplifiers on the output side can be suitably set depending upon the system to which the present apparatus is applied.

In the optical multiplexing apparatus having the abovementoned constitution, when the optical signals of wavelengths $\lambda_1$ to $\lambda_{32}$ are input in a state that the neighboring wavelength are maintained to be cross polarized to each other, these optical signals are amplified and dispersion compensated, and then separated into the optical signals of odd wavelengths and the optical signals of even wavelengths, which are, then, separately mutiplexed by the two AWGs 10 and 20. The optical signals of odd wavelengths and the optical signals of even wavelengths multiplexed by the respective AWGs 10 and 20, are further multiplexed by the interleaver 30, and then amplified up to a required level to be output.

As described above, a plurality of optical signals maintained in a cross polarization state are divided into the optical signals of odd wavelengths and the optical signals of even wavelengths to be multiplexed individually. Therefore, even when the wavelength interval is set to be as very narrow as, for example, 50 GHz, it is possible to use the existing AWG corresponding to a wavelength interval of twice as wide (100 GHz). Further, the AWGs 10 and 20 are required to have a function of maintaining the polarization. Here, the directions of polarization of the optical signals multiplexed by the AWGs 10 and 20 are oriented in one direction. Therefore, as mentioned above, if the waveguides of the AWGs 10 and 20 are formed by using for example a material of a large double refractive index, the function for maintaining the polarization can be easily realized, making it possible to use the AWGs 10 and 20 of a low cost. On the other hand, the AWG utilizing the multiple beam interference does not exhibit sufficiently sharp filter characteristics. It is therefore probable that the crosstalk occurs among the channels if the optical signals multiplexed by the respective AWGs 10 and 20 are simply multiplexed for their wavelengths. Therefore, in the apparatus of the present invention, the occurrence of crosstalk is suppressed by multiplexing the optical signals of odd wavelengths and the optical signals of even wavelengths by utilizing the interleaver 30 having filter characteristics which are more sharp than those of the AWGs 10 and 20.

By the combination of the AWGs 10, 20 with the interleaver 30, it becomes possible to lower the nonlinear optical effect and to reliably multiplex a plurality of optical signals having narrow wavelength intervals while suppressing the crosstalk. In such an optical multiplexing apparatus, when upgrading the system, it is possible to increase or decrease the number of channels separately for the optical signals of odd wavelengths and for the optical signals of even wavelengths, offering convenience.

In the above-mentioned embodiment, 32 waves were multiplexed and the wavelength interval was set to be 50 GHz. The present invention, however, is in no way limited thereto only. Further, the wavelength band was described as a 1.5 $\mu$m band. The invention, however, can also be applied when the optical signals of other wavelength band are to be multiplexed.

What is claimed are:

1. An optical multiplexing apparatus for multiplexing a plurality of optical signals having different wavelengths, comprising:

first optical multiplexing means for multiplexing, among a plurality of optical signals that are input with directions of linear polarization of neighboring wavelengths being differed to each other and are successively given wavelength numbers depending upon the wavelengths, optical signals corresponding to odd wavelength numbers, while maintaining their polarization states;

second optical multiplexing means for multiplexing optical signals corresponding to even wavelength numbers among said plurality of optical signals, while maintaining their polarization states; and third optical multiplexing means including:

a first input unit filtering the optical signals multiplexed by said first optical multiplexing means in accordance with filter characteristics that include a transmission wavelength band with the wavelengths of odd numbers as centers, and having a band width of said transmission wavelength band which is narrower than the band width of transmission wavelength band of filter characteristics of said first optical multiplexing means;

a second input unit filtering the optical signals multiplexed by said second optical multiplexing means in accordance with filter characteristics that include a transmission wavelength band with the wavelengths of even numbers as centers, and having a band width of said transmission wavelength band which is narrower than the band width of transmission wavelength band of filter characteristics of said second optical multiplexing means; and an output unit multiplexing the optical signals output from said first input unit and the optical signals output from said second input unit to output the multiplexed signal light;

wherein said third optical multiplexing means comprises an interleaver including a first input port which corresponds to said first input unit and a second input port which corresponds to said second input unit, and including one output port corresponding to said output unit, and having periodic filter characteristics for each of said first and second input ports, and wherein a band width of each transmission wavelength band in the periodic filter characteristics of said first input port of said interleaver is narrower than the band width of the transmission wavelength band in the filter characteristics of said first optical multiplexing means, and a band width of each transmission wavelength band in the periodic filter characteristics of said second input port of said interleaver is narrower than the band width of the transmission wavelength in the filter characteristics of said second optical multiplexing means.

2. An optical multiplexing apparatus according to claim 1, wherein said plurality of optical signals are input with directions of linear polarization of neighboring wavelengths being orthogonal to each other.

3. An optical multiplexing apparatus according to claim 1, wherein said third optical multiplexing means is provided with a function for maintaining the polarization state.

4. An optical multiplexing method of multiplexing a plurality of optical signals having different wavelengths, comprising:

a first optical multiplexing step of multiplexing, among a plurality of optical signals that are input with directions of linear polarization of neighboring wavelengths being differed to each other and are successively given wavelength numbers depending upon the wavelengths, optical signals corresponding to odd wavelength numbers, while maintaining their polarization states;

a second optical multiplexing step of multiplexing optical signals corresponding to even wavelength numbers among said plurality of optical signals, while maintaining their polarization states; and a third optical multiplexing step of:
  using an interleaver having first and second input ports and one output port;
  filtering the optical signals multiplexed by said first optical multiplexing step in accordance with periodic filter characteristics of the first input port of said interleaver that include a transmission wavelength band with the wavelengths of odd numbers as centers, and having a band width of said transmission wavelength band which is narrower than the band width of the transmission wavelength band of filter characteristics of said first optical multiplexing step;
  filtering the optical signals multiplexed by said second optical multiplexing means in accordance with periodic filter characteristics of the second input port of said interleaver that include a transmission wavelength band with the wavelengths of even numbers as centers, and having a band width of the transmission wavelength band which is narrower than the band width of the transmission wavelength band of filter characteristics of said second optical multiplexing step; and
  multiplexing the respective filtered optical signals to output the multiplexed signal light from said output port of said interleaver.

5. An optical multiplexing apparatus for multiplexing a plurality of optical signals having different wavelengths, including even wavelengths and odd wavelengths, comprising:

a first multiplexer having filter characteristics to multiplex the odd wavelength optical signals to produce multiplexed odd wavelength optical signals;

a second multiplexer having filter characteristics to multiplex the even wavelength optical signals to produce multiplexed even wavelength optical signals; and an interleaver to multiplex the multiplexed odd wavelength optical signals and the multiplexed even wavelength optical signals to produce multiplexed signal light, said interleaver including:
  a first input port having first periodic filter characteristics, to receive the multiplexed odd wavelength optical signals;
  a second input port having second periodic filter characteristics, to receive the multiplexed even wavelength optical signals; and
  an output port to output the multiplexed signal light,
  wherein a band width of each transmission wavelength band in the first periodic filter characteristics of said first input port is narrower than a band width of a transmission wavelength band in the filter characteristics of said first optical multiplexer, and
  a band each transmission wavelength band in the periodic filter characteristics of said input port is narrower than a band width of a transmission wavelength in the filter characteristics of said second optical multiplexer.

* * * * *

UNITED STATES PATENT AND TRADEMARK OFFICE
CERTIFICATE OF CORRECTION

PATENT NO. : 6,904,240 B1
APPLICATION NO. : 09/717129
DATED : June 7, 2005
INVENTOR(S) : Katsuhiko Suga et al.

It is certified that error appears in the above-identified patent and that said Letters Patent is hereby corrected as shown below:

Column 10,
Line 45, change "a band" to -- a band width of --.
Line 46, change "said" to -- said second --.

Signed and Sealed this

Eleventh Day of July, 2006

JON W. DUDAS
*Director of the United States Patent and Trademark Office*